Dec. 30, 1969 THOMAS TSING TON YEN 3,486,499

BLOOD PRESSURE APPARATUS WITH MEANS FOR OBTAINING PEAK AND AVERAGE VOLTAGE MEASUREMENTS OF FLUCTUATING VOLTAGE WAVES

Filed March 6, 1967 2 Sheets-Sheet 1

INVENTOR.
THOMAS TSING TON YEN
BY
Kendrick, Subkow & Stolzy
ATTORNEY

Dec. 30, 1969 THOMAS TSING TON YEN 3,486,499
BLOOD PRESSURE APPARATUS WITH MEANS FOR OBTAINING PEAK AND AVERAGE VOLTAGE MEASUREMENTS OF FLUCTUATING VOLTAGE WAVES
Filed March 6, 1967 2 Sheets-Sheet 2

THOMAS TSING TON YEN
INVENTOR.

BY
Kendrick, Subkow & Stolzy
ATTORNEY

United States Patent Office 3,486,499

Patented Dec. 30, 1969

3,486,499
BLOOD PRESSURE APPARATUS WITH MEANS FOR OBTAINING PEAK AND AVERAGE VOLTAGE MEASUREMENTS OF FLUCTUATING VOLTAGE WAVES

Thomas Tsing Ton Yen, Los Angeles, Calif., assignor to Statham Instruments, Inc., Los Angeles, Calif., a corporation of California Filed Mar. 6, 1967, Ser. No. 621,023
Int. Cl. A61b *5/02*; H03f *1/00*
U.S. Cl. 128—2.05 8 Claims

ABSTRACT OF THE DISCLOSURE

This disclosure relates to the measurement of peak and average voltage of a signal having a pulsating voltage wave, containing both an AC and a DC component, and is particularly adapted to the measurement of peak and average voltages of complex voltage waves of relatively large period as, for example, in the measurement of the diastolic and systolic pressures represented by the electrical output of a blood pressure transducer.

The prior art, as known to applicant, solves the problem presented by the requirement to determine the systolic and diastolic pressures recorded as an electrical output of a blood pressure transducer by separately sensing the peak voltage by means of a peak voltage rectifier and separately sensing the peak-to-peak voltage by a peak-to-peak voltage rectifier, and employing a subtractive circuit which subtracts the peak-to-peak signal from the peak signal. The peak signal is responsive to the systolic pressure, and the difference voltage is responsive to the diastolic pressure.

The present invention presents a simplified system having a fast response which makes it particularly suitable for blood pressure measurements.

In the circuit of my invention, the differential input connections to a differential amplifier are both connected to one pole of the signal source, and the common connection of the differential amplifier is connected to another pole of the signal source. A condenser is placed between the pole connected to both of the differential inputs, in series with one of the differential inputs of the differential amplifier. In this case, the output of the differential amplifier is the average voltage of the pulsating voltage output from the signal source.

With a positive half-wave rectifier placed between the common and a point between the condenser and one of the differential inputs and in series therewith, the output of the differential amplifier is proportional to the maximum peak voltage of variable voltage source.

If a negative half-wave rectifier is placed in place of the positive half-wave rectifier, the output of the differential amplifier will be proportional to the minimum peak voltage, i.e., the valley voltage.

Figure 1:
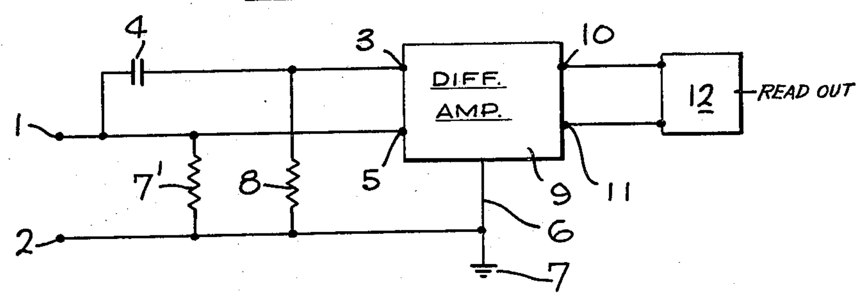
FIG. 1 illustrates an elementary averaging circuit according to my invention.
Figure 4:
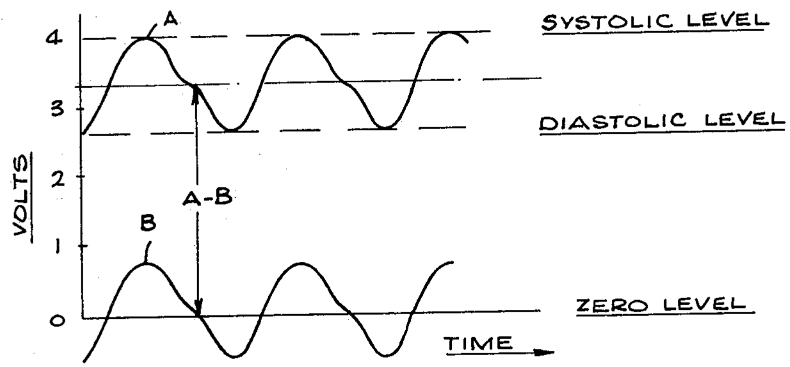
FIGS. 4 to 6 are wave forms which illustrate the principles of my invention.
Figure 5:
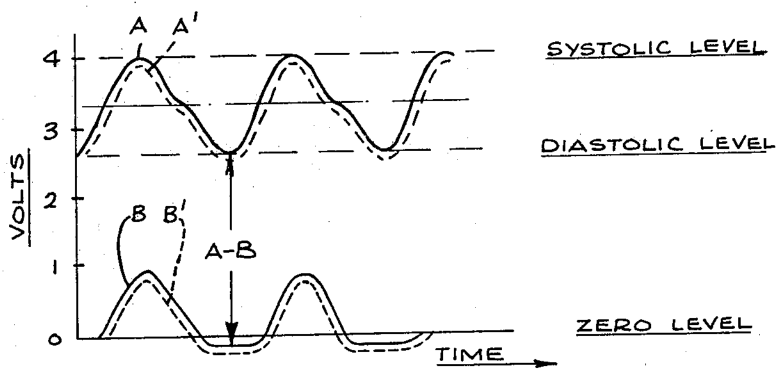
Figure 6:
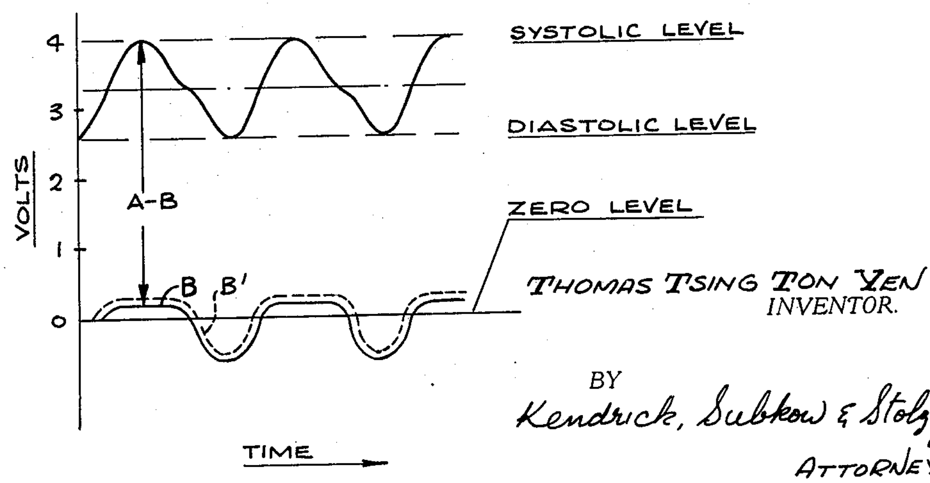

In FIG. 1 the input signal, which may, for example, be a complex wave responsive to the heart beat, such as illustrated in FIGS. 4–6, is applied across input terminals 1 and 2.

The input terminal 1 is connected to both of the differential input terminals 3 and 5 of the differential amplifier 9. The connection to 3 is through the condenser 4. The input terminal 2 is connected to the common connection 6 of the differential amplifier 9 and to ground at 7, or any other reference potential. The biasing resistor 7' is connected between the common connection 6 and the differential terminal 5, and the biasing resistor 8 is connected to the common connection 6 and to the other differential input terminal 3, and between 3 and condenser 4.

The AC component passes through 4, and the AC and DC components pass to 5. The output at 10 and 11, which is typically a fluctuating DC component, is measured at the read-out 12, such as a meter or recorder, and is proportional to the average of the voltages of the wave. This is illustrated by FIG. 4, where A is the original signal and B is the AC component of A. The output of the differential amplifier is proportional to A–B and therefore to the average voltage of the wave A.

Figure 2:
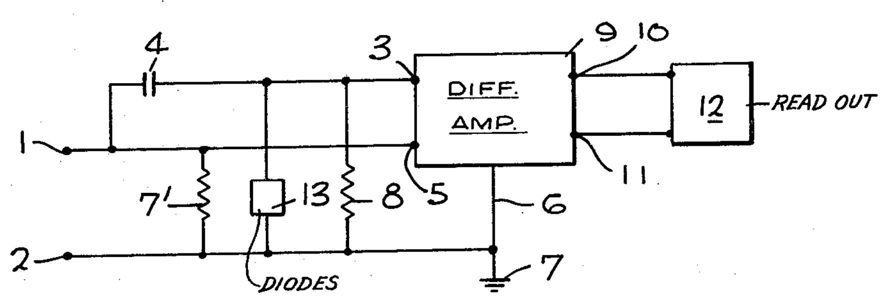
FIG. 2 illustrates an elementary circuit for measuring either the maximum peak or the minimum peak voltage, depending upon the nature of the half-wave rectifier, as will be described more fully below.

FIG. 2 illustrates a circuit for measuring either the maximum or minimum peak, as will appear below.

The circuit of FIG. 2 is the same as that in FIG. 1, except as stated below. Like numbers apply to like parts.

The diode 13 acts as a half-wave rectifier. If the diode is a positive half-wave rectifier, the zero reset is as illustrated in FIG. 5, and the differential amplifier output will be proportional to the minimum peak voltage B. If the half-wave rectifier diode 13 is oppositely poled, so as to be a negative half-wave rectifier, the differential output is as illustrated in FIG. 6, i.e., proportional to the maximum peak voltage A–B.

In all of the above circuits the AC signal is fed as a common mode signal across the common and both of the differential inputs to the differential amplifier. The AC signal is impressed across the differential input 3 and the common 6 and also across the differential input 5 and the common 6.

In FIG. 1 the output will be proportional to the average value of the DC component, since the AC component is cancelled by reason of the common mode rejection; and the output is proportional to the difference signal which is the average value of the DC component.

Figure 3:
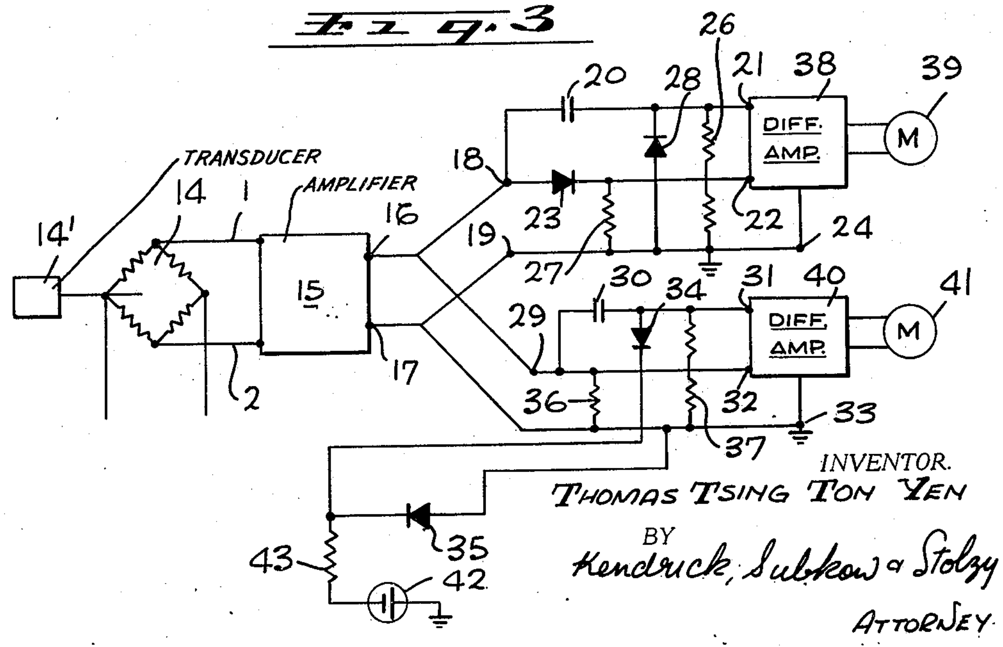
FIG. 3 illustrates the application of the circuit to a blood pressure transducer.

In FIGS. 2 and 3 the half-wave rectification introduces a DC bias on the AC component, so that a relocation of the wave, as illustrated in FIGS. 5 and 6, occurs.

The above considerations assume the ideality of the diodes 13. However, a finite voltage drop is always present across the diodes, and instead of the solid line curves on FIGS. 4–6 the curves will actually be as shown in the dotted lines at B'. In order to correct for this inaccuracy, a compensating diode is introduced. This diode has the effect of lowering the A curve to A', so that the read-out will be in effect proportional to A–B.

This is illustrated in the system which is, at present, a preferred embodiment of my invention.

In FIG. 3, 14' is a blood pressure transducer which will generate a signal at 1 and 2, which follows the blood pressure and produces a fluctuating voltage, for example, as illustrated in FIGS. 4, 5 and 6. Such transducers may be cardiovascular pressure transducers, either of the intra-arterial type, or an extra-arterial transducer such as a sphygmomanometer, or any other pressure gage which is responsive to blood pressure and produces an electrical signal.

It is now common practice to use strain gage pressure transducers employing filaments whose resistance changes with strain, and employing bridge 14 read-outs such as the bridge illustrated in FIG. 3. Instead of a Wheatstone bridge read-out of a strain gage, I may employ gages using potentiometer read-outs, industrial type or capacitance type read-outs, to give an electrical signal responsive both to the static and the wave form of the blood pressure.

The signal output is as schematically illustrated in FIGS. 4–6.

The curve of the blood pressure wave consists of a high static pressure modified by an AC signal. In normal blood pressure, a peak-to-peak value of the signal is about 30% of the amplitude of the maximum potential above zero; and the period of the wave is the pulse rate.

This signal, as illustrated in FIGS. 4–6, passes to an amplifier 15, whose output is at 16 and 17. 16 is connected to a circuit such as is illustrated in FIG. 2, containing a positive half-wave rectifier 28, compensated for by a diode 23 and also connected to a circuit such as shown in FIG. 2, employing a negative half-wave rectifying diode.

Thus, the output 16 is connected to common connection 18, which in turn is connected through condenser 20 to the differential input terminal 21 of the differential amplifier 38 and through the diode 23 to the differential input 22 of the amplifier 38. It is also connected to the common connection 29 to the differential input 31 of the differential amplifier 40 through the condenser 30 and directly to the differential input 32 of the differential amplifier 40. 17 is connected to the common 24 of the amplifier 38 and to the common 33 of the amplifier 40.

The positive half-wave rectifying diode 28 is connected between the common 24 and the differential input 21 of the differential amplifier 38, at a point between 21 and the condenser 20. The biasing resistors 27 are connected between the common 24 and the terminal 22, and the biasing resistor 26 is connected between the common 24 and the differential input terminal 21, the common 24 being grounded or referred to any chosen reference potential. The potential drop across 23 is made to be substantially equal to the potential drop across 28, so that the reduction in the potential of 21 above ground resulting from the potential drop across 28 is compensated for by a substantially equal reduction of the potential at 22 above ground.

The negative half-wave rectifier diode 34 is connected in series with a compensating diode 35 between the common connection 33 and the input terminal 31 of the differential amplifier 40 between the condenser 30 and the differential input terminal 31. The biasing resistor 36 is connected between the input terminal 32 and the common 33, and the biasing resistor 37 is connected between the input terminal 31 and the common 33. The common 33 is connected to ground or to any reference potential. A voltage source 42 is connected through resistor 43 to a point between diodes 34 and 35, so as to hold that point a potential sufficient to cancel out the voltage drop across 34.

The output of the differential amplifier 38 is measured at a meter or other sensing device, shown at 39. The output of the differential amplifier 40 is measured at a meter or other output sensing device, shown at 41. The meter 39 will measure the diastolic pressure, and the meter 41 will measure the systolic pressure.

While I have described a particular embodiment of my invention for the purpose of illustration, it should be understood that various modifications and adaptations thereof may be made within the spirit of the invention, as set forth in the appended claims.

I claim:

1. A circuit for sensing the voltage of a fluctuating voltage signal containing both a DC component and an AC component, which comprises a differential amplifier, including a pair of differential signal input connections and a common connection, a common terminal connected to each of the said differential input connections, a condenser between said common terminal and one of said differential input connections, and a pair of output terminals to said differential amplifier, and means for sensing the differential signal at said output terminals.

2. A circuit for sensing the peak voltage of a fluctuating voltage signal containing both a DC component and an AC component, which comprises a differential amplifier, including a pair of differential signal input connections, a common connection to said differential amplifier, and a common terminal connected to each of said differential input connections, a condenser between said common terminal and one of said differential input connections, and a pair of output terminals, and means for sensing the differential signal of said output terminals, a half-wave rectifier connected to said common connection and to the differential connection to which said condenser is also connected.

3. The circuit of claim 2, said half-wave rectifier being a positive half-wave rectifier.

4. In the circuit of claim 3, a compensating diode in series with said common terminal and the other of said differential input connections.

5. The circuit of claim 2, said half-wave rectifier being a negative half-wave rectifier.

6. In the circuit of claim 5, a compensating diode in series with said negative half-wave rectifier and said common connection.

7. A blood pressure measuring circuit comprising a blood pressure transducer which generates a complex voltage wave responsive to blood pressure variation, said wave having an AC and a DC component, an amplifier (15), a pair of differential amplifiers (38 and 40), one output terminal (17) of said amplifier connected to the common connection (24 and 33) of each of the two differential amplifiers (38 and 40), the other output connection (16) of the amplifier (15) connected to both differential input terminals (21 and 22) of one differential amplifier and to both differential input terminals (31 and 32) of the other differential amplifier; a condenser (20) in series with one of said output terminals [(16)] (17) of said amplifier (15) and one of the differential input terminals (21) of one of said differential amplifiers; a condenser (30) in series with said other output connection (16) of said amplifier; and a differential input connection (31) of the other differential amplifier; and a positive half-wave rectifier (28) connected to the common of one of said differential amplifiers (24) and between the first-mentioned condenser (20) and the differential input terminal in series therewith (21), and a negative half-wave rectifier connected to the common (33) of the other differential amplifier (40); and the differential input terminal (31) in series with said second-mentioned condenser (30); and a read-out connected to each of the output connections of each of the differential amplifiers.

8. In the circuit of claim 7, a compensating diode in series with the other differential input connection (22) of the first-mentioned differential amplifiers (38), and a compensating diode in series with the negative half-wave rectifier (34).

References Cited

UNITED STATES PATENTS

| | | | |
|---|---|---|---|
| 3,229,685 | 1/1966 | Ringkamp et al. | 128—2.05 |
| 3,277,312 | 10/1966 | Harris | 330—69 X |
| 3,343,064 | 9/1967 | Bright | 324—120 X |
| 3,363,177 | 11/1968 | Houghton | 324—123 |

WILLIAM E. KAMM, Primary Examiner

U.S. Cl. X.R.

324—123; 330—69